United States Patent
Selitrennikoff et al.

(10) Patent No.: US 7,162,530 B2
(45) Date of Patent: *Jan. 9, 2007

(54) SYSTEM AND METHOD FOR ENCAPSULATING DATA WITHIN A FORMATTED DATA PROTOCOL

(75) Inventors: Sean Selitrennikoff, Bellevue, WA (US); Chad Verbowski, Bellevue, WA (US); Bryan Mark Willman, Kirkland, WA (US); Adam D Barr, Redmond, WA (US); Sadagopan Rajaram, Tarnaka (IN)

(73) Assignee: Microsoft Corporation, Redmond, WA (US)

( * ) Notice: Subject to any disclaimer, the term of this patent is extended or adjusted under 35 U.S.C. 154(b) by 169 days.

This patent is subject to a terminal disclaimer.

(21) Appl. No.: 10/840,873

(22) Filed: May 7, 2004

(65) Prior Publication Data

US 2004/0210666 A1    Oct. 21, 2004

Related U.S. Application Data (63) Continuation of application No. 09/747,604, filed on Dec. 22, 2000, now Pat. No. 6,901,449.

(51) Int. Cl.
   *G06F 15/16*    (2006.01)
(52) U.S. Cl. .................. 709/230; 709/236; 709/246
(58) Field of Classification Search ............. 713/201; 715/513, 744; 370/467; 709/230, 236, 246
   See application file for complete search history.

(56) References Cited

U.S. PATENT DOCUMENTS

| 6,008,805 | A | * | 12/1999 | Land et al. .................. 715/744 |
| 6,070,245 | A |   | 5/2000  | Murphy et al. |
| 6,343,328 | B1 |   | 1/2002  | Murphy et al. |
| 6,636,528 | B1 | * | 10/2003 | Korpi et al. ................ 370/467 |
| 6,662,342 | B1 | * | 12/2003 | Marcy ........................ 715/513 |

OTHER PUBLICATIONS

Chiu, A Perceptual-Based Video Coder for Error Resilience, Proceedings of the DCC'99 Data Compression Conference, 1999, p. 521.

Sudhakar, et al., Low-Complexity Error Selective Viterbi Decoder, Electronics Letters, vol. 36, No. 2, Jan. 20, 2000, pp. 147-148.

Heidtmann, Evaluation of Video Communication Over Packet Switching Networks, Dependable Conmputing—EDDC-3, Third European Dependable Computing Conference Proceedings, 1999, pp. 24-41.

(Continued)

*Primary Examiner*—Rupal Dharia
*Assistant Examiner*—Quang N. Nguyen
(74) *Attorney, Agent, or Firm*—Amin, Turocy, & Calvin, LLP (57) ABSTRACT

A system and method are provided for encoding data in accordance with the present invention. The system includes a first subsystem for encoding a second data protocol within a formatted data protocol without disrupting display operations associated with the first data protocol. An encapsulation sequence is provided to isolate the second data protocol from the formatted data protocol, wherein a monitoring subsystem receives status from the first subsystem via the second data protocol.

24 Claims, 5 Drawing Sheets

OTHER PUBLICATIONS

Bhattacharyya, et al., DCT Coefficient-Based Error Detection Technique for Compressed Video Stream, 2000 IEEE Int'l. Conference on Multimedia and Expo ICME2000 Proceedings, Latest Advances in the Fast Changing World of Multimedia, vol. 3, 2000, pp. 1483-1486.

Ebrahimi, MPEG-4 Vedeo Verification Model: A Video Encoding/Decoding Algorithm Based on Content Representation, Signal Processing: Image Commication, vol. 9, No. 4, 1997, pp. 367-384.

Durst, et al., Unicode in XML and other Markup Languages, Jun. 23, 2000, W3C, http://www.unicode.org/unicode/reports/tr20/tr20-4.html.

Davis, Forms of Unicode, Sep. 1999, IBM, http://www.4.ibm.com/software/developer/library/utfencodingforms/index.html.

Tittel, et al., XML for Dummies, Apr. 2000, Wiley Publishing, 2nd Edition, p. 14.

* cited by examiner

SYSTEM AND METHOD FOR ENCAPSULATING DATA WITHIN A FORMATTED DATA PROTOCOL

RELATED APPLICATIONS

This application is a continuation of U.S. Pat. No. 09/747,604, filed on Dec. 22, 2000 now U.S. Pat. No. 6,901,499, entitled "SYSTEM AND METHOD FOR ENCAPSULATING DATA WITHIN A FORMATTED DATA PROTOCOL." The entirety of which is incorporated herein by reference.

TECHNICAL FIELD

The present invention relates generally to computer systems, and more particularly to a system and method for encapsulating data within a formatted data protocol wherein the encapsulated data communicates information and/or status without disrupting display presentations associated with the formatted data.

BACKGROUND OF THE INVENTION

Computer systems are often employed in monitoring and administering other systems such as other computers and/or machines. Monitoring and administering systems generally enable administrators to troubleshoot problems that have occurred with other computers and machines, and can aid in determining status and/or health of such computer systems and machines before problems occur. In many cases, information is sent from one computer system to another to enable monitoring, administering, and troubleshooting. For example, information is often sent over a serial port from a computer being monitored to a second computer that displays the information. The information can be in the form of display text (e.g., "Fatal system error", "Memory low") and can include other information such as formatting information that may affect, control and/or position the display text.

Many computer systems send text in combination with formatting information over a communications link, such as the serial port, in order to display status and/or other computer system information. The formatting information is often employed to position and/or format the text on a display screen, for example. Text information may be utilized to communicate status to an operator from the computer system, wherein the status may be related to system operations, system output, numerical information, and/or error information. Unfortunately, if the operator is not viewing the display as the information or message stream is sent, the information may not be acted upon. Even having an automated process monitor the message stream may not be sufficient because the formatting and message information sent are generally designed for human consumption and may be ambiguous to a monitoring computer. If hundreds or thousands of such displays require monitoring, valuable system information may likely be lost.

This problem is especially prevalent during system crashes and related error conditions since human response time is very slow and costly during catastrophes. When the operator attempts to check a plurality of displays in order to perform troubleshooting or maintenance, it is cumbersome, time consuming, and often fruitless to discern what caused the system problem. Since many displays and associated data buffers are checked manually, a problem arises in relation to human interpretation of events leading up to a system failure and reacting systematically according to the interpretation.

It may be desirable to send error information along with the formatted data, however, in order to record vital system and status information that is not associated with the display information. Unfortunately, if additional data were merely integrated with the formatted data, expected display presentations may likely be interfered with. For example, the formatted data may include text fields such as "Time" and "Date" wherein each field includes an associated formatting sequence to guide the position/format of the text fields on the display screen. If additional data were included along with the formatted data, either the display fields and/or related formatting sequences may likely be affected. Thus, the display may improperly present the content of the text fields and/or format related thereto. Furthermore, if the display text were monitored by a subsequent machine, an improper analysis may occur and thus cause unpredictable actions.

In view of the above problems associated with conventional computers and monitoring systems, there is an unsolved need for a system and/or methodology to facilitate transmission of information over an existing protocol without disrupting functionality associated therewith.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology for sending and receiving status information from a first computer system to a second computer system over an existing communications link. This is achieved without affecting previously/currently transmitted system display information and effectively maintaining initial protocol semantics for backward compatibility. The present invention encodes a second data protocol such as a data string (e.g., XML, binary, HEX) within a formatted data protocol wherein the formatted data may include both presentation data and formatting information related thereto. The formatting information may include display information to enable positioning of data on a display screen, for example. As an example, a VT100 display/escape code sequence provides such formatting information to position/format related textual data on a display screen.

In accordance with the present invention, an encapsulation and encoding sequence is provided to isolate the second data protocol from the formatted data protocol and to enable the second data protocol to be transmitted with the formatted data protocol. By encapsulating and encoding the second data protocol within the formatted data, another computer system may receive the second data protocol to log, detect and analyze errors without affecting ongoing presentations of the formatted data, for example. In other words, a tunneling occurs wherein a second arbitrary protocol is transmitted over a first protocol. It is noted that this process can repeat, whereby a third protocol is tunneled over the second protocol, or if a different encapsulation and encoding sequence is employed, another protocol transmitted over the original encoding sequence. Thus, other information (e.g., error/status) may be concurrently transmitted with the display information to enable logging and/or analysis of status information without disrupting the displayed data and associated formatting information.

In accordance with one aspect of the present invention, a system is provided for encoding data. The system includes a first subsystem for generating presentation data via a first data protocol and a component for encoding data other than the presentation data within the first data protocol via a second data protocol. The component encapsulates the encoded data to isolate the second data protocol from the first data protocol to mitigate disruption of the presentation data.

In accordance with another aspect of the present invention, a methodology for encoding data is provided. The method includes: generating presentation data via a first data protocol; encoding data other than presentation data via a second data protocol; and encapsulating the encoded data to isolate the second data protocol from the first data protocol to mitigate disruption of the presentation data.

In accordance with yet another aspect of the present invention, a system for encoding data is provided. The system includes: means for generating presentation data via a first data protocol; means for encoding data other than presentation data via a second data protocol; and means for encapsulating the encoded data to isolate the second data protocol from the first data protocol to mitigate disruption of the presentation data.

According to another aspect of the present invention, an encoded data signal for transmission between at least two systems is provided. The signal includes a first data protocol containing presentation data and a second data protocol encapsulated within the first data protocol to isolate the second data protocol from the presentation data.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout.

The present invention relates to a system and methodology to facilitate status information transmissions over an existing protocol that includes presentation data without disrupting the presentation data. A second protocol is employed to encode the status information, wherein the second protocol is isolated from the existing protocol via an encapsulating sequence. A monitoring system may utilize the encapsulating sequence to extract the second protocol from the existing protocol in order to log/analyze status information associated with a target computer system. Encapsulation can also be employed in situations where a password, or other sensitive data needs to be passed in a channel that is not encrypted. For example, an encrypted password can be sent along a channel which is not displayed, and cannot be read by a third party 'sniffing' a stream.

Figure 1:
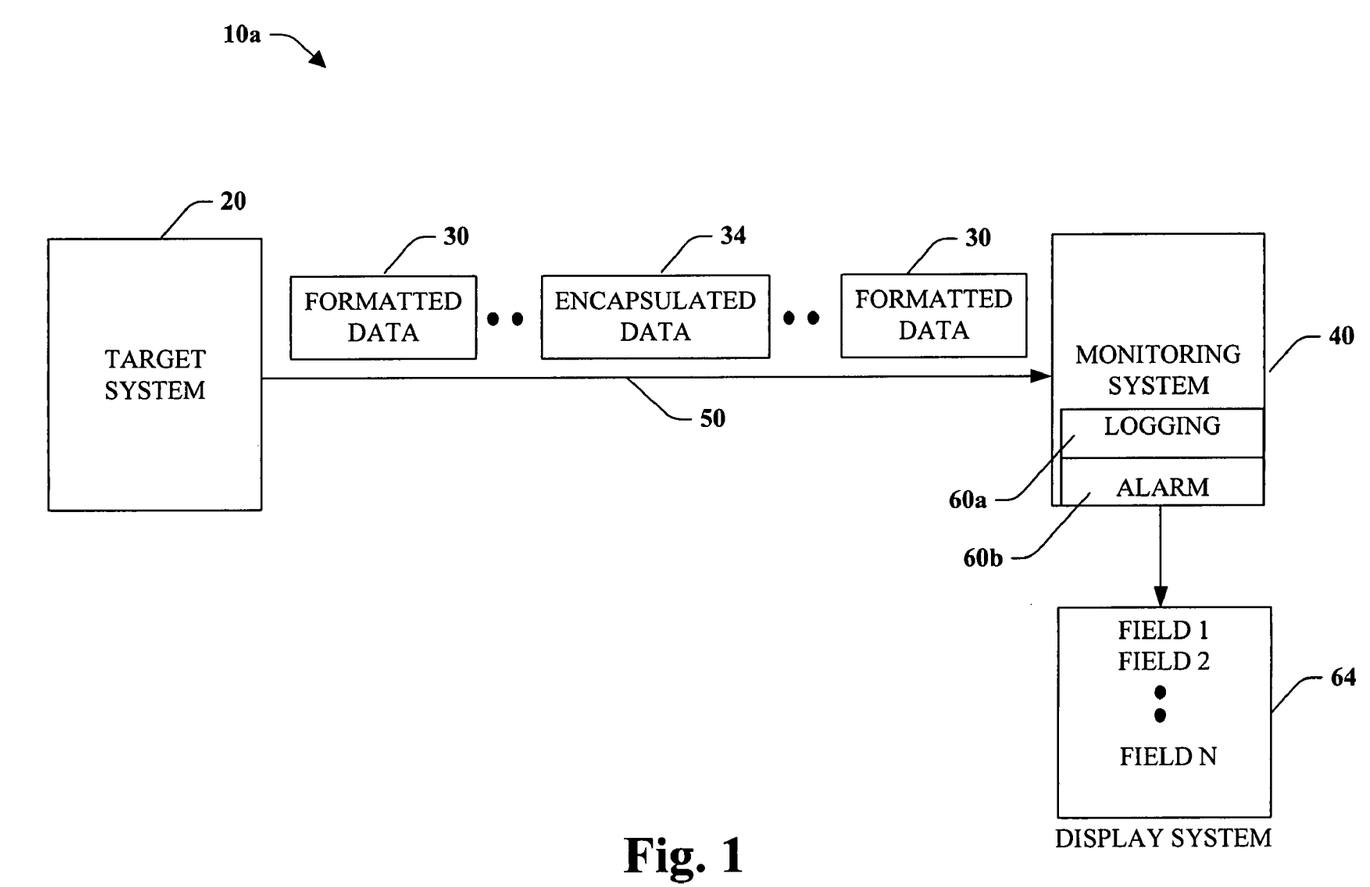
FIG. 1 is a schematic block diagram illustrating an encapsulated data system in accordance with an aspect of the present invention.

Referring initially to FIG. 1, a system 10a illustrates an aspect of encapsulated data transmission in accordance with the present invention. A target system 20 outputs formatted data 30 and encapsulated data 34 to a monitoring system 40 via a serial connection 50. The encapsulated data 34 may include status information (e.g., error codes, messages, events) relating to the target system 20. For example, the target system 20 may be a UNIX and/or other computer substation, wherein the status is related to operating conditions and events associated with the substation. These events may be related to error messages and failure conditions generated by the target system 20, for example. Upon receiving the status, the monitoring system 40 can automatically analyze the status and/or take further actions based upon the status. Thus, the monitoring system 40 can monitor the encapsulated data 34 and take automated actions such as shutting the target system 20 down in the event of a detected problem. Additionally, the monitoring system 40 can log the status in a memory 60a enabling an operator to troubleshoot and maintain the target system 20. As will be described in more detail below, the encapsulated data 34 may also enable an audio alarm 60b at the monitoring system 40 to further aid the operator.

A display system 64 may also be included with the system 10a providing text output Fields 1 through N that are associated with the formatted data 30. For example, Field 1 may include the text "Bank" whereas Field 2 may include the text "Deposit". Also included in the formatted data 30 are formatting and/or control data that controls and positions the Fields 1 through N on the display system 64. By utilizing the encapsulated data 34 of the present invention, status information may be transmitted from the target system 20 to the monitoring system 40 without disrupting the content and/or positioning of the Fields 1 through N. As an example, the formatted data 30 may be a VT100 serial protocol as is well understood, wherein the encapsulated data 34 is transmitted without disrupting the VT100 data codes (e.g., ASCII) and formatting codes (e.g., escape code sequences). It is to be appreciated that other formatted data 30 may be employed (e.g., Terminal Emulation for TELNET, TN3270, TN5250, VT320, VT340, VT420, VT220, WYSE).

Figure 2A:
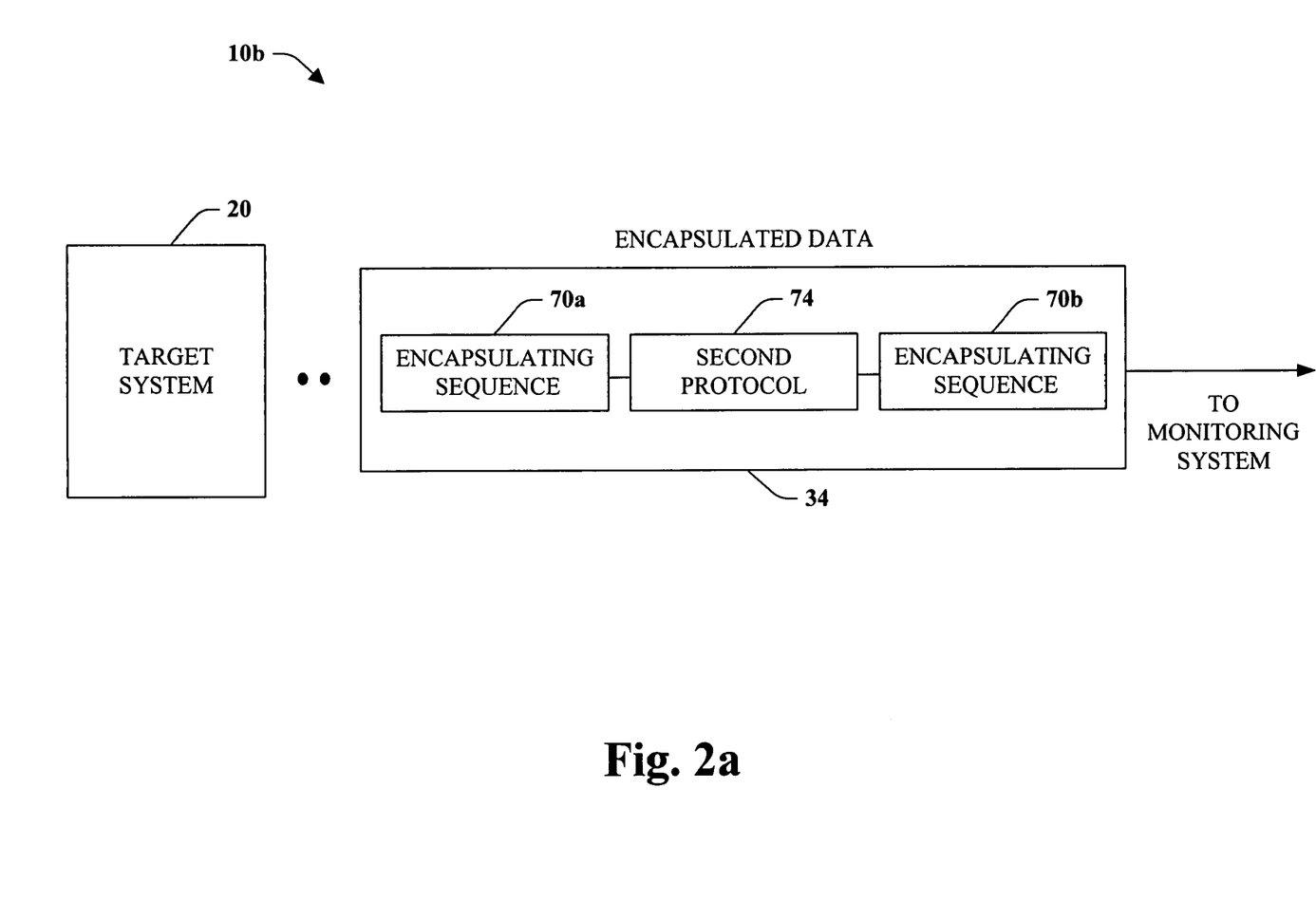
FIG. 2a is a schematic block diagram illustrating a system providing encapsulated data and encoding via an encapsulating sequence and a second protocol in accordance with an aspect of the present invention.

Referring now to FIG. 2a, a system 10b illustrates an aspect of the present invention relating to the encapsulated data 34 depicted in FIG. 1. The encapsulated data 34 may include encapsulating sequences 70a and 70b that enable the monitoring system to extract the encapsulated data 34. This may be achieved by monitoring for the encapsulating sequence 70a and extracting the next N bytes, N being an integer, until receiving the encapsulating sequence 70b. Within the encapsulating sequences 70a and 70b, a second protocol 74 may be employed to encode the status information from the target system. It is to be appreciated that the second protocol 74 may be a plurality of associated codes that are encoded within the encapsulated data sequences. For example, the second protocol 74 may be an XML data stream encoded in UTF-8 format.

As will be described in more detail below, a known escape sequence within the encapsulated data 34, may include XML data describing the target system failure. This information may be read out of the serial stream by client administration software at the monitoring system, for example. When the client receives the information, it may then process the information such as to log an event, generate a Windows Management Infrastructure (WMI) event, and so forth. This information may also be employed for less severe messages such as warnings. As will be described in more detail below, an ASCII character 0×7 may be employed for the encapsulating sequences 70a and 70b, wherein these codes may generate an audio "beep" at client systems that are not adapted in accordance with the present invention, thus providing at least some notification of an error.

Figure 2B:
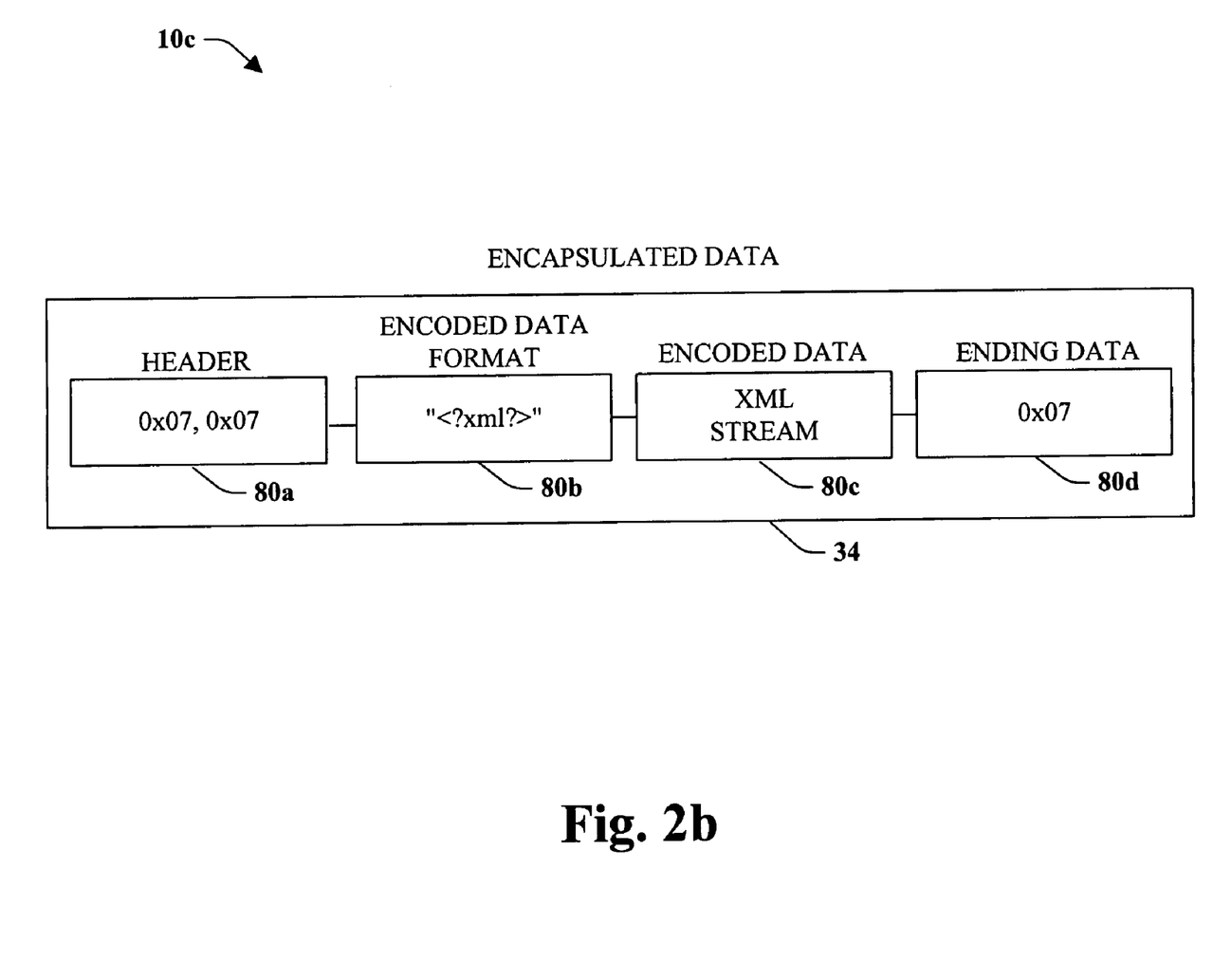
FIG. 2b is a schematic block diagram illustrating an exemplary encapsulating sequence and encoded data format in accordance with an aspect of the present invention.

Turning now to FIG. 2b, an exemplary encapsulated and encoded data sequence 10c is illustrated in accordance with an aspect of the present invention. It is to be appreciated by those skilled in the art that other sequences and codes may be employed. For example, the encapsulated data may include a header 80a including one or more control characters such as 07 hex (Control-G). This sequence is well understood as a VT100 code wherein the 07 code may be employed by a display device as a Bell character that can trigger an audible sound in the display device. An encoded data format field 80b follows the header, wherein this field may specify the format of the following encoded data. For example, this field may include the text characters <?xml?> to signal that xml data has been encoded in the encapsulated data 34. An encoded data field 80c follows the format field 80b and includes encoded data. For example, an XML stream of data encoded in UTF-8 format may be included. An ending data field 80d may also be included to signal the end of the encapsulated data 34.

The encapsulated data 34 depicted in FIG. 2b, mitigates the likelihood this stream of data may appear naturally in the text fields described above. It is noted that the presence of <?xml?> indicates XML data, however, other data representations may be employed as described above. If a client system is adapted for monitoring the protocol as illustrated in FIG. 2b, then it may extract this protocol, utilize it, and display the rest of the data. It is noted, that a client system not configured in accordance with the present invention may send this protocol data to its display without disruption to the display, since the encapsulating data 34 is sent first, followed by the screen information to display. In this manner, the actual screen information is displayed after the encapsulating data 34 has been transmitted and will therefore be what remains on the display screen of a system not configured with the present invention.

Figure 3:
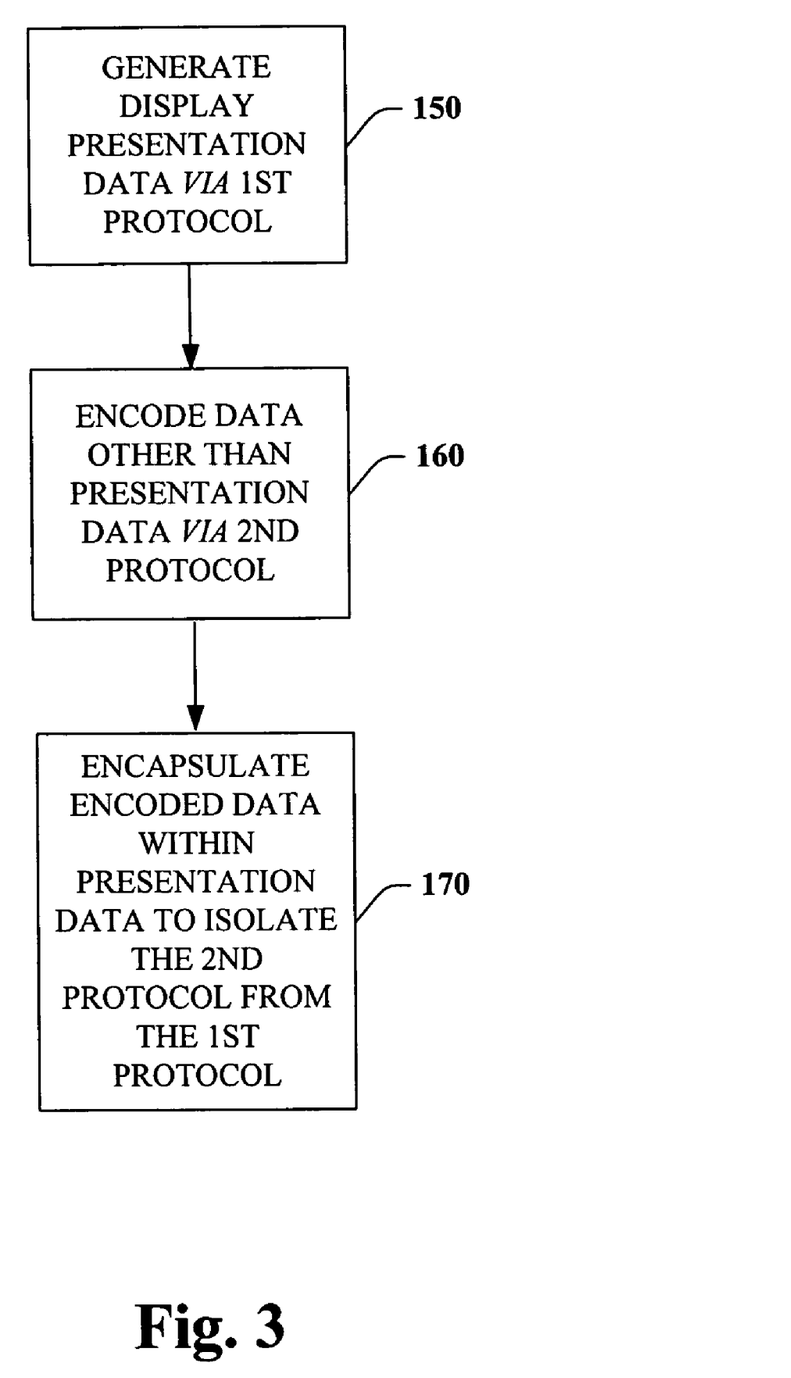
FIG. 3 is a flow chart diagram illustrating a methodology for enabling a first protocol transmission within a formatted data transmission without disruption to the formatted data in accordance with an aspect of the present invention.

FIG. 3 illustrates a methodology for enabling a first protocol transmission within a formatted data transmission in accordance with an aspect of the present invention. While, for purposes of simplicity of explanation, the methodology is shown and described as a series of steps, it is to be understood and appreciated that the present invention is not limited by the order of steps, as some steps may, in accordance with the present invention, occur in different orders and/or concurrently with other steps from that shown and described herein. For example, those skilled in the art will understand and appreciate that a methodology could alternatively be represented as a series of interrelated states, such as in a state diagram. Moreover, not all illustrated steps may be required to implement a methodology in accordance with an aspect the present invention.

Referring to FIG. 3, and proceeding to step 150, presentation data is generated via a first protocol. As described above, the presentation data may include formatting information to further position the presentation data. At step 160, data other than the presentation data is encoded via a second protocol. As described above, this data may include many forms of encoded data such as an XML stream, for example. It is to be appreciated that substantially any data type may provide the encoded data (e.g., binary/HEX codes, WML, SGML, HTML, QML). At step 170, the encoded data is encapsulated within the presentation data in order to enable isolation of the second protocol generated at step 160 and the first protocol generated at step 150. As described above, this may be achieved via an encapsulating sequence of control characters.

Figure 4:
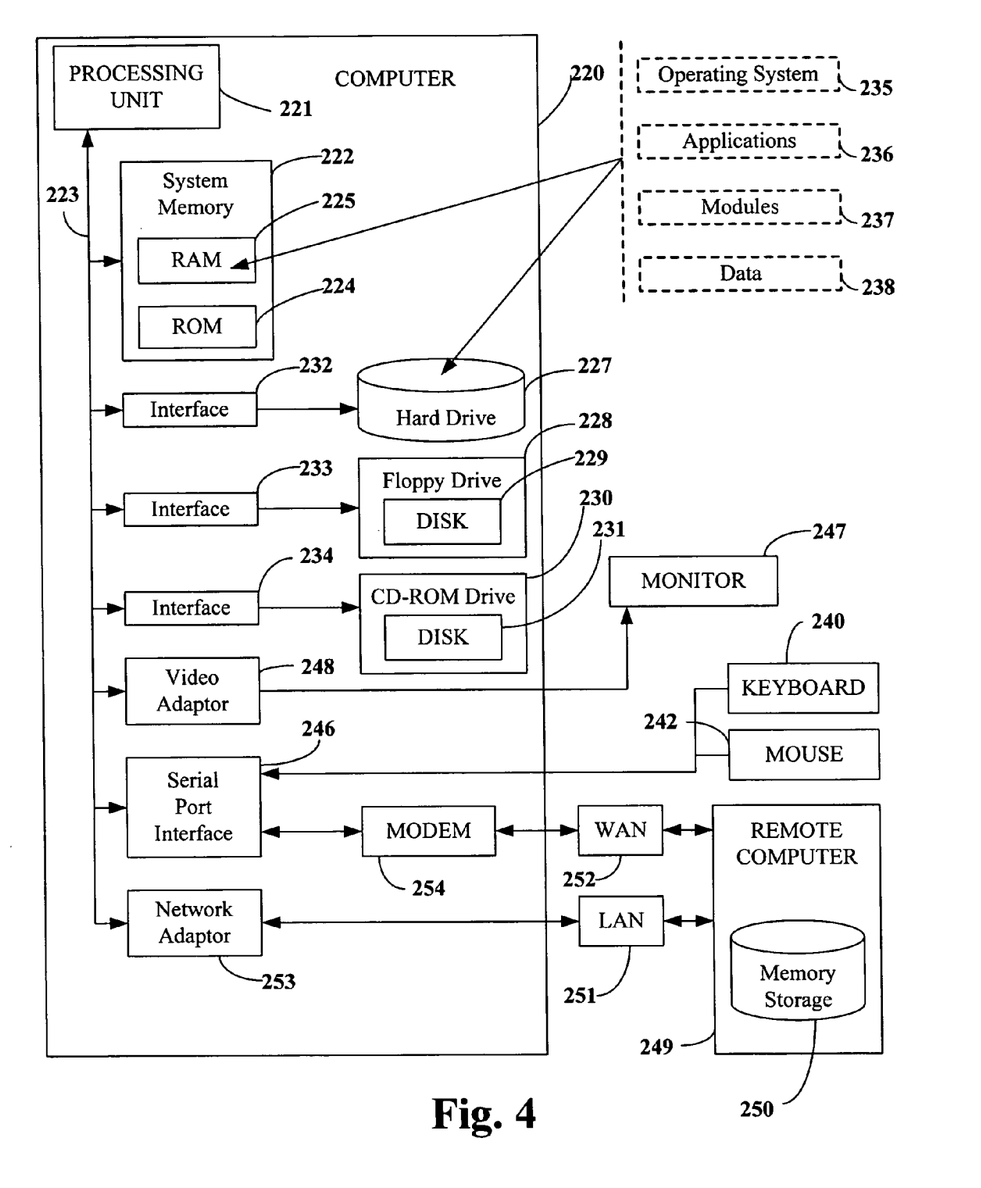
FIG. 4 is a schematic block diagram illustrating a suitable computing environment in accordance with an aspect of the present invention.

In order to provide a context for the various aspects of the invention, FIG. 4 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 4, an exemplary system for implementing the various aspects of the invention includes a conventional computer 220, including a processing unit 221, a system memory 222, and a system bus 223 that couples various system components including the system memory to the processing unit 221. The processing unit 221 may be any of various commercially available processors, including but not limited to Intel x86, Pentium® and compatible microprocessors from Intel and others, including Cyrix, AMD and Nexgen; Alpha® from Digital; MIPS® from MIPS Technology, NEC, IDT, Siemens, and others; and the PowerPC® from IBM and Motorola. Dual microprocessors and other multi-processor architectures also can be used as the processing unit 221. Dual microprocessors and other multi-processor architectures also may be employed as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be a Microsoft® operating system (e.g., Windows® NT operating system). It is to be appreciated that other operating systems may be employed such as UNIX, LINUX, for example.

A user may enter commands and information into the server computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 4. The logical connections depicted in FIG. 4 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for encoding data, comprising:
   a first subsystem that generates presentation data via a first data protocol, the first data protocol comprising a formatted data protocol; and
   a component that encodes, within the first data protocol, a second data protocol indicative of operating conditions of the first subsystem; the encoded second data protocol facilitates isolation from the first data protocol via an encapsulation sequence to mitigate disruption of the presentation data, a control sequence associated with the formatted data protocol enables a signal that indicates that the encapsulation sequence was transmitted.

2. The system of claim 1, wherein the second data protocol is encoded via non-ASCII characters.

3. The system of claim 2, wherein the second data protocol utilizes XML data.

4. The system of claim 3, wherein the XML data is encoded in a UTF-8 format.

5. The system of claim 1, wherein the formatted data protocol is at least one of a VT100, TN3270, TN5250, VT320, VT340, VT420, VT220 and WYSE protocol.

6. The system of claim 1, wherein the control sequence enables detection of the encapsulation sequence.

7. The system of claim 1, wherein the control sequence includes an element to describe the second data protocol.

8. The system of claim 1, wherein the second data protocol provides information relating to the first subsystem.

9. The system of claim 8, further comprising a monitoring subsystem for receiving the information from the first subsystem via the second protocol.

10. The system of claim 9, wherein the monitoring subsystem monitors the encapsulation sequence to interpret the second protocol to enable storing of the information.

11. The system of claim 9, wherein the monitoring subsystem communicates to the first subsystem via the second data protocol.

12. A method for encoding data, the method comprising:
generating presentation data via a first data protocol, the first data protocol comprising a formatted data protocol;
encoding event data associated with a first computer within the first data protocol via a second data protocol;
encoding the event data within an encapsulation seguence to isolate the second data protocol from the first data protocol to mitigate disruption of the presentation data; and
enabling, by a control sequence associated with the formatted data protocol, a signal that indicates that the encapsulation sequence was transmitted.

13. The method of claim 12, wherein the formatted data protocol is at least one of a VT100, TN3270, TN5250, VT320, VT340, VT420, VT220 and WYSE protocol.

14. The method of claim 12, wherein the second data protocol is an XML steam.

15. The method of claim 14, wherein the XML stream is encoded in a UTF-8 format.

16. The method of claim 12, wherein the encoded data is encapsulated via the control sequence.

17. The method of claim 16, wherein the control sequence enables detection of the encapsulated encoded data.

18. A computer-readable medium having computer-executable instructions for performing the method of claim 12.

19. A system for encoding data, comprising:
means for generating presentation data via a first data protocol, the first data protocol comprising a formatted data protocol;
means for encoding event data associated with a first computer within the first data protocol via a second data protocol;
means for encoding the event data within an encapsulation sequence such that the second data protocol is isolated from the first data protocol to mitigate disruption of the presentation data; and
means for enabling, by a control sequence associated with the formatted data protocol, a signal that indicates that the encapsulation sequence was transmitted.

20. The system of claim 19, wherein the formatted data protocol is at least one of a VT100, TN3270, TN5250, VT320, VT340, VT420, VT220 and WYSE protocol.

21. The system of claim 19, wherein the second data protocol is an XML stream.

22. The system of claim 21, wherein the XML stream is encoded in a UTF-8 format.

23. The system of claim 19, wherein the encoded data is encapsulated via the control sequence.

24. An encoded data signal for transmission between at least two computer systems, comprising:
a first data protocol that contains presentation data, the first data protocol comprising a formatted data protocol;
a second data protocol representative of diagnostic data of one of the at least two computer systems encapsulated within the first data protocol via an encapsulation sequence, the encapsulation facilitates isolation of the second data protocol from the presentation data; and
a control sequence associated with the formatted data protocol, the control sequence enables a signal that indicates that the encapsulation sequence was transmitted.

* * * * *

UNITED STATES PATENT AND TRADEMARK OFFICE
CERTIFICATE OF CORRECTION

PATENT NO.       : 7,162,530 B2                                          Page 1 of 1
APPLICATION NO.  : 10/840873
DATED            : January 9, 2007
INVENTOR(S)      : Sean Selitrennikoff et al.

It is certified that error appears in the above-identified patent and that said Letters Patent is hereby corrected as shown below:

On the title page, item (56), under "Other Publications", in column 2, line 7,
delete "Conmputing" and insert -- Computing --, therefor.

On page 2, item (56), under "Other Publications", in column 1, line 6,
after "MPEG-4" delete "Vedeo" and insert -- Video --, therefor.

On page 2, item (56), under "Other Publications", in column 1, line 8,
delete "Commication" and insert -- Communication --, therefor.

In column 1, line 7, delete "Pat. No." and insert -- Application No. --, therefor.

In column 9, line 16, in Claim 12, delete "seguence" and insert -- sequence --, therefor.

In column 9, line 27, in Claim 14, delete "steam" and insert -- stream --, therefor.

Signed and Sealed this

Twentieth Day of July, 2010

David J. Kappos
*Director of the United States Patent and Trademark Office*